Figure 1:
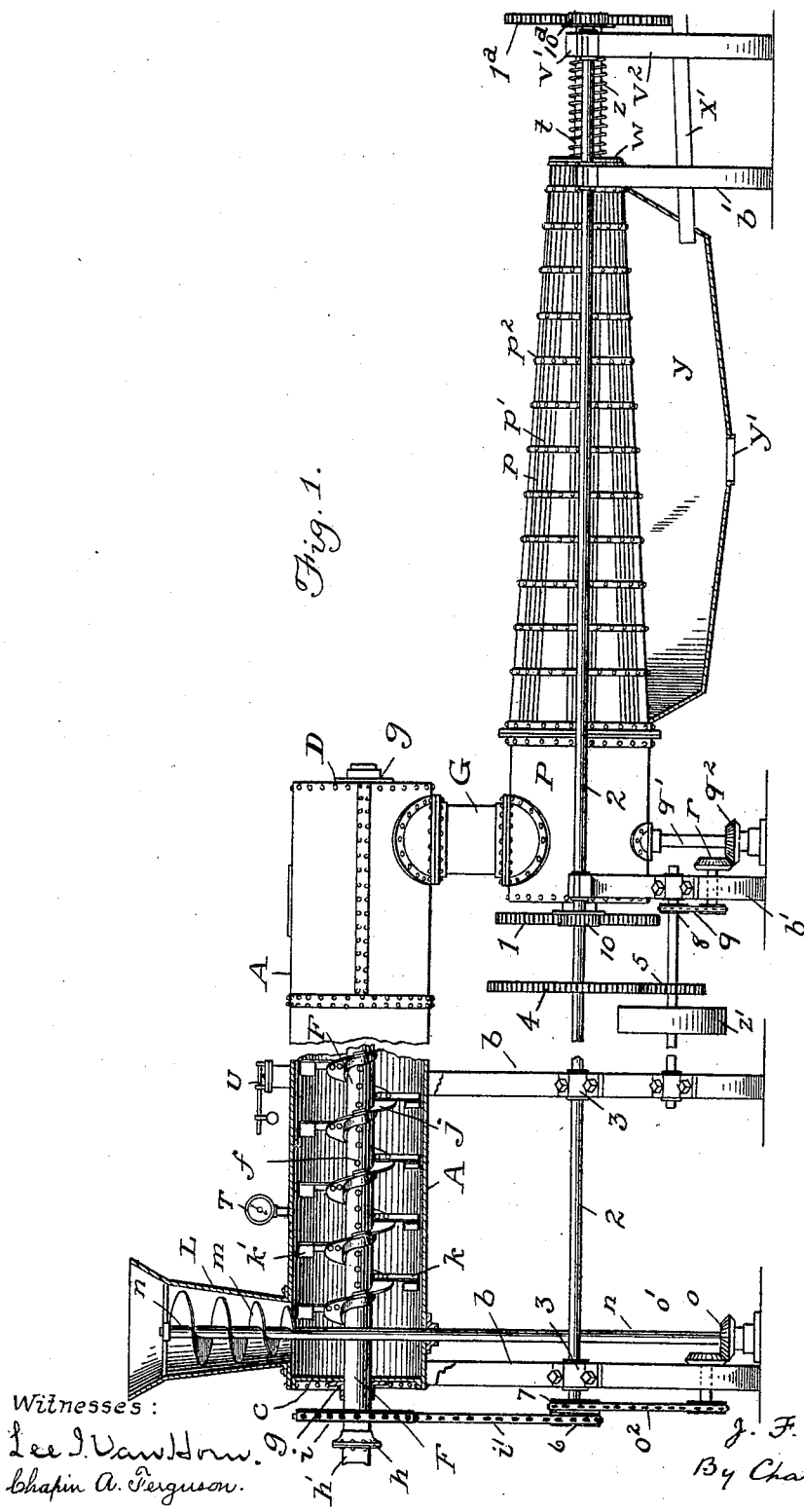

No. 641,266. Patented Jan. 16, 1900.
J. F. BUSSELLS.
RENDERING AND PRESSING APPARATUS.
(Application filed July 19, 1898. Renewed May 31, 1899.)
(No Model.) 2 Sheets—Sheet 1.

Witnesses:
Lee J. Van Horn.
Chapin A. Ferguson.

Inventor :—
J. F. Bussells
By Chas. B. Mann
Attorney.

No. 641,266. Patented Jan. 16, 1900.
J. F. BUSSELLS.
RENDERING AND PRESSING APPARATUS.
(Application filed July 19, 1898. Renewed May 31, 1899.)
(No Model.) 2 Sheets—Sheet 2.
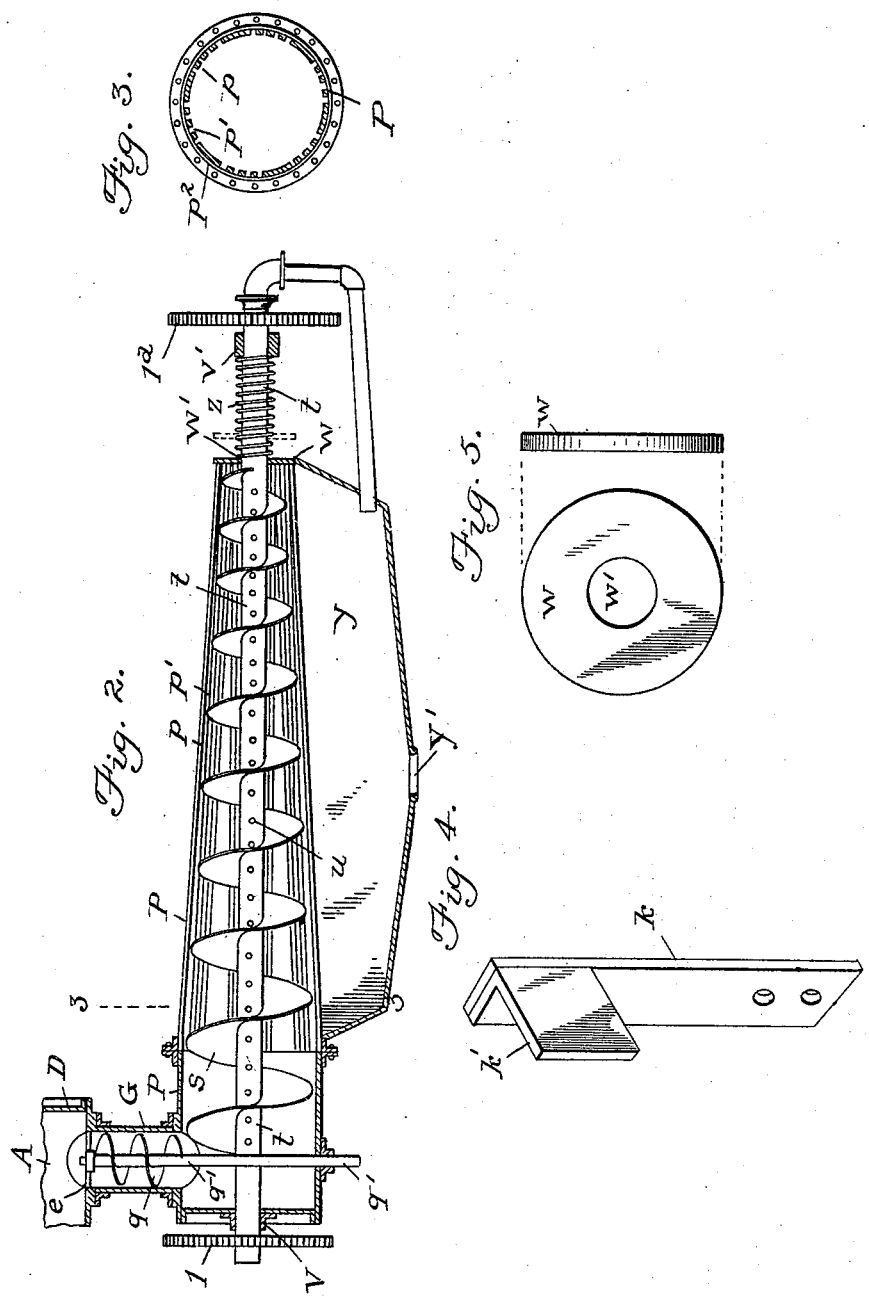
Witnesses:-
Lee J. Van Horn.
Chapin A. Ferguson
Inventor:-
J. F. Bussells
By Chas. B. Mann
Attorney.

UNITED STATES PATENT OFFICE.

JOSEPHUS F. BUSSELLS, OF IRVINGTON, VIRGINIA, ASSIGNOR OF ONE-FOURTH TO ALBRO J. MORSE, OF HARBORTON, VIRGINIA.

RENDERING AND PRESSING APPARATUS.

SPECIFICATION forming part of Letters Patent No. 641,266, dated January 16, 1900.

Application filed July 19, 1898. Renewed May 31, 1899. Serial No. 718,921. (No model.)

*To all whom it may concern:*

Be it known that I, JOSEPHUS F. BUSSELLS, a citizen of the United States, residing at Irvington, in the county of Lancaster and State of Virginia, have invented certain new and useful Improvements in Cooking and Pressing Apparatus, of which the following is a specification.

This invention relates to an apparatus for cooking and pressing the material cooked for the purpose of extracting the oil, juices, and water.

The invention embraces new and improved features of construction of an apparatus for which Letters Patent No. 604,348 of the United States were granted me May 17, 1898.

The invention is illustrated in the accompanying drawings, in which—

Figure 1 is a longitudinal elevation, partly in section, of the complete apparatus. Fig. 2 is a longitudinal section of the compressor-case and shows the receiver below and the delivery-pipe coupled to the end of the hollow shaft. Fig. 3 is a cross-section of the compressor-case. Fig. 4 is a detail view of one of the agitator-arms in the cooking-cylinder. Fig. 5 shows the yielding plate employed at the discharge end of the compressor.

The cooking-cylinder A is substantially horizontal, though it might be used on an incline. It rests on suitable supports $b$. At the feeding-in end the cylinder is closed by a head $c$ and at the discharge end by a head D. A tubular shaft or pipe F extends lengthwise through the cylinder and revolves in a hole or bearing $g$ in each head, and the ends of this shaft project on the outside of the heads. At one end the shaft is fitted to a stuffing-box $h$, to which a steam-supply pipe $h'$ is attached, and a sprocket-wheel $i$ is fixed on this projecting end for a chain, by which the shaft F may be revolved. Within the cylinder the hollow shaft has small holes $f$ for steam to pass from the shaft to the cylinder, and a spiral flange $j$ is fixed around the shaft in the cylinder and extends from one end to the other. Agitator-arms are attached to the spiral flange $j$. One of the arms is shown in Fig. 4 and comprises a shank $k$, at the end of which is an angle-blade $k'$, one side of the angle-blade being secured to the shank and the other projecting and serving as a paddle or stirrer.

An opening $e$ is in the bottom of the cooking-cylinder at the discharge end, and a vertical cylindric neck G is secured around this opening and projects down below the cylinder and connects with the top of compressor-case P.

The feeding-in device is constructed and arranged to permit the entrance to the cylinder of a continuous supply of fish or other material to be cooked and at the same time to prevent the escape at such device of steam under pressure from the cylinder. This device comprises the feed-neck L, opening into the cylinder and having a funnel or hopper mouth, and a force-feed screw $m$, revoluble in said neck, as in my former patent. The feed-screw $m$ is fixed on a shaft $n$, which has on its end a bevel-pinion $o$, which gears with and is driven by another wheel $o'$.

The case P of the compressor is tapered, and its large end is joined to the cylindric neck G, which serves as a passage for the material. This neck incloses a force-feed screw $q$, mounted on a shaft $q'$, projecting below. At its lower end this shaft has a bevel-pinion $q^2$, which gears with another pinion $r$. The large section end of the compressor-case, to which the neck G is attached, is cylindric and not tapered and is tight or entirely free of outlets or perforations. The tapered part of the compressor-case has its large end attached to the cylindric part and is made of longitudinal bars or slats $p$, with open spaces $p'$ between them. Hoops $p^2$ surround these bars on the exterior and are riveted thereto. The compressor-case is supported on standards $b'$. A tapered compressing-screw $s$ is on a pipe or hollow shaft $t$ within the case. This hollow shaft has holes $u$ along its length. These holes admit oil, juices, and water into the shaft. The shaft at one end turns in a hole $v$ in the closed head and in a bearing $v'$, supported on a standard $v^2$. A stationary oil-delivery pipe $x'$ is coupled to the end of the hollow shaft, this latter pipe discharging into an oil and water receiver $y$ immediately below the case P. The said receiver has a discharge-opening $y'$. The hollow shaft $t$ in the compressor-case projects from both ends thereof. One end has a gear-wheel 1 rigidly mounted on said projecting end. Another wheel $1^a$ of the same size is rigidly fixed on the other end of the same shaft. By this means the power of driving the compressing-screw $s$ is applied at both ends of the shaft.

At the small end or discharge end of the compressor-case and loosely mounted on the hollow shaft $t$ is a closing-plate $w$, circular in shape, with a central hole $w'$, which takes on the shaft $t$, so as to slide thereon. A spiral spring $z$ is around the hollow shaft and presses against the closing-plate $w$ and keeps it normally against the said discharge end of the compressor-case. When the material—fish, or whatever it may be in the case—is being pressed by the tapered screw $s$, this spring-pressed plate offers some resistance to the discharge of said material, and thereby insures that the oil, juices, and water will be expressed therefrom. The plate, of course, will yield to allow the pressed product in the case to discharge therefrom.

The mechanism for driving the moving parts will now be described.

I employ a main shaft 2, which entends the entire length of the apparatus. This shaft is mounted in as many bearings 3 as may be deemed necessary. A large gear-wheel 4 is on the shaft and is engaged by a smaller wheel 5 on the drive-shaft below it. The drive-shaft has a driven pulley $z'$, to which power is applied. The main shaft 2 has at the cooker end two sprocket-wheels 6 7, and a drive-chain $i'$ connects from the wheel 6 to the sprocket $i$ on the shaft F, by which the latter is driven. A drive-chain $o^2$ connects from the wheel 7 to a sprocket on the same shaft with the bevel-pinion $o'$, by which the feed-screw $m$ is driven. The drive-shaft has a sprocket 8, and a chain 9 connects therefrom to a sprocket on the same shaft with the bevel-pinion $r$, and thereby the force-feed screw $q$ is driven. The main shaft 2 has a small gear 10, which engages the gear-wheel 1 on the hollow shaft $t$ of the compressor, and a like small gear $10^a$, also on the main shaft, engages the other wheel $1^a$, and thereby the compressor-shaft is driven.

A pressure-gage T and blow-off valve U may be employed on the cooker-cylinder.

The general operation of this apparatus is like that of my former patent already referred to. An important improvement, however, has been made in connecting the compressor-case with the cooking-cylinder and in providing a force-feed device interposed between the cooking-cylinder and the compressor-case. Another improvement consists of the spring-pressed plate for closing the discharge end of the compressor-case.

Having thus described my invention, what I claim is—

1. The combination of a cooking-cylinder; an agitator in the said cylinder to stir the material that is being cooked; a compressor-case having means for pressing the cooked material after it has passed from the cylinder; a neck joining a discharge-opening in the cooking-cylinder with the said compressor-case; and a force-feed screw revolving in said neck.

2. In a cooking apparatus the combination of a cooking-cylinder; a revoluble agitator extending lengthwise within the cylinder; inlets for steam under pressure and opening into the cylinder; a feeding-in device at one end of the cylinder which permits continuous feeding of the material to be cooked and at same time prevents back escape of steam; a discharge-opening at the other end of the cylinder; a compressor-case having means for pressing the cooked material after it has passed from the cylinder; and a force-feed device interposed between the said discharge-opening of the cylinder and the entrance to the compressor.

3. The combination of a cooking-cylinder; an agitator in the said cylinder to stir the material that is being cooked; a compressor-case below the cylinder; a neck, G, connecting the side of the cylinder with the side of the compressor-case; a shaft extending longitudinally through the compressor-case and projecting from both ends thereof; two gear-wheels—one on each of said projecting ends of the compressor-shaft; a driven shaft extending lengthwise of the compressor-case and having two gear-wheels each of which meshes with a different one of said wheels on the compressor-shaft.

4. The combination of a tapered compressor-case having its small end open; a revoluble compressing-screw in the said case and having its shaft end projecting from said small end; and a spring-pressed plate around the shaft end and closing the small end of the said case.

5. In a compressor-case the combination of a large section end cylindric in shape and imperforate; a tapered section having longitudinal bars or slats with open spaces between them and its large end joined to said cylindric section end; and hoops exteriorly surrounding the bars or slats of said tapered section.

In testimony whereof I affix my signature in the presence of two witnesses.

JOSEPHUS F. BUSSELLS.

Witnesses:
CHAPIN A. FERGUSON,
STEPHEN S. MANN.